United States Patent
Nakayama (10) Patent No.: US 10,814,780 B2
(45) Date of Patent: Oct. 27, 2020

(54) ULTRASONIC WAVE OUTPUT DEVICE

(71) Applicant: DENSO CORPORATION, Kariya, Aichi-pref. (JP)

(72) Inventor: Toshiaki Nakayama, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/524,573

(22) Filed: Jul. 29, 2019

(65) Prior Publication Data

US 2019/0344709 A1 Nov. 14, 2019

Related U.S. Application Data

(63) Continuation of application No. PCT/JP2018/002491, filed on Jan. 26, 2018.

(30) Foreign Application Priority Data

Feb. 1, 2017 (JP) ................. 2017-016809

(51) Int. Cl.
*B60Q 5/00* (2006.01)
*H04R 1/34* (2006.01)

(52) U.S. Cl.
CPC ............... *B60Q 5/00* (2013.01); *H04R 1/34* (2013.01)

(58) Field of Classification Search
CPC .................................. B60Q 5/00; H04R 1/34
USPC ........................................................ 340/467
See application file for complete search history.

(56) References Cited

U.S. PATENT DOCUMENTS

| | | | | |
|---|---|---|---|---|
| 4,580,250 A | * | 4/1986 | Kago | G01S 15/931 340/904 |
| 4,858,203 A | * | 8/1989 | Hansen | G01S 7/526 367/103 |
| 5,059,946 A | * | 10/1991 | Hollowbush | G01S 7/521 340/435 |
| 5,309,144 A | * | 5/1994 | Lacombe | G08B 25/008 340/502 |
| 5,764,136 A | * | 6/1998 | Harron | B60Q 1/52 340/435 |
| 6,347,266 B1 | * | 2/2002 | Kageyama | B62D 1/28 340/435 |
| 7,046,127 B2 | * | 5/2006 | Boddy | B60Q 1/305 340/426.17 |

(Continued)

FOREIGN PATENT DOCUMENTS

| | | |
|---|---|---|
| JP | 2006282044 A | 10/2006 |
| JP | 2009184640 A | 8/2009 |

(Continued)

*Primary Examiner* — Ojiako K Nwugo
(74) *Attorney, Agent, or Firm* — Harness, Dickey & Pierce, P.L.C.

(57) ABSTRACT

An ultrasonic wave output device includes a plurality of ultrasonic wave output units and an overlapping range change unit. The plurality of ultrasonic wave output units are arranged along a horizontal direction in a vehicle. Each of the plurality of ultrasonic wave output units emits an audible sound generated with ultrasonic waves, which have a same phase, to corresponding one of a plurality of sound areas. The plurality of sound areas indicate predetermined areas. The overlapping range change unit changes a range of an overlapping area, which indicates an area on which the plurality of sound areas overlap, in response to an external instruction.

5 Claims, 11 Drawing Sheets

(56) References Cited

U.S. PATENT DOCUMENTS

| | | | | |
|---|---|---|---|---|
| 7,492,913 | B2* | 2/2009 | Connor | H04R 1/403 |
| | | | | 381/77 |
| 8,212,656 | B2* | 7/2012 | Nakayama | B60Q 5/008 |
| | | | | 340/384.1 |
| 2007/0040664 | A1* | 2/2007 | Johnson | B60Q 1/444 |
| | | | | 340/467 |
| 2011/0003614 | A1* | 1/2011 | Langereis | G01S 15/06 |
| | | | | 455/550.1 |
| 2011/0175713 | A1* | 7/2011 | Nakayama | B60Q 5/006 |
| | | | | 340/435 |
| 2012/0051556 | A1 | 3/2012 | Pompei | |
| 2012/0140597 | A1* | 6/2012 | Park | G01S 15/04 |
| | | | | 367/103 |
| 2012/0166042 | A1* | 6/2012 | Kokido | B60Q 5/008 |
| | | | | 701/36 |
| 2013/0099922 | A1* | 4/2013 | Lohbihler | G08B 13/184 |
| | | | | 340/539.17 |
| 2014/0355765 | A1* | 12/2014 | Kulavik | H04S 7/302 |
| | | | | 381/17 |
| 2018/0005528 | A1* | 1/2018 | Loeillet | G08G 1/165 |
| 2018/0208112 | A1 | 7/2018 | Tayama | |

FOREIGN PATENT DOCUMENTS

| | | |
|---|---|---|
| JP | 2011162073 A | 8/2011 |
| WO | WO-2017/014035 A1 | 1/2017 |

* cited by examiner

ULTRASONIC WAVE OUTPUT DEVICE

CROSS REFERENCE TO RELATED APPLICATIONS

The present application is a continuation application of International Patent Application No. PCT/JP2018/002491 filed on Jan. 26, 2018, which designated the United States and claims the benefit of priority from Japanese Patent Application No. 2017-016809 filed on Feb. 1, 2017. The entire disclosures of all of the above applications are incorporated herein by reference.

TECHNICAL FIELD

The present disclosure relates to an ultrasonic wave output device that generates an audible sound with ultrasonic waves.

BACKGROUND

A technique employing a parametric speaker for a vehicle which outputs an audible sound generated with ultrasonic waves has been proposed.

SUMMARY

An ultrasonic wave output device includes a plurality of ultrasonic wave output units. The plurality of ultrasonic wave output units may be arranged along a horizontal direction in a vehicle. Each of the plurality of ultrasonic wave output units emits an audible sound generated with ultrasonic waves to corresponding one of a plurality of sound areas.

BRIEF DESCRIPTION OF DRAWINGS

The above and other objects, features and advantages of the present invention will become more apparent from the following detailed description made with reference to the accompanying drawings. In the drawings.

DETAILED DESCRIPTION

For example, a configuration that transmits an alarm sound to a pedestrian can be considered. The inventor of the present disclosure has discovered a difficulty that the alarm sound can be a noise to people except for the pedestrian.

An example embodiment of the present disclosure provides a technique that enables an ultrasonic wave output device that outputs ultrasonic waves to change a range of sound to be easily heard.

In an example embodiment of the present disclosure, an ultrasonic wave output device includes a plurality of ultrasonic wave output units and an overlapping range change unit. The plurality of ultrasonic wave output units are arranged along a horizontal direction in a vehicle. Each of the plurality of ultrasonic wave output units emits an audible sound generated with ultrasonic waves, which have a same phase, to corresponding one of a plurality of sound areas. The plurality of sound areas indicate predetermined areas. The overlapping range change unit changes a range of an overlapping area, which indicates an area on which the plurality of sound areas overlap, in response to an external instruction.

The ultrasonic wave output device can widen or narrow the overlapping area where the sound field areas generated with the plurality of ultrasonic wave output units in response to the external instruction. The overlapping area is the range where the ultrasonic waves are superimposed to make the audible sound louder and the sound is easy to be heard. Thus, the configuration can arbitrarily set the range of the audible sound emitted from the vehicle to be easily heard.

Embodiments of the present disclosure will be described below with reference to the drawings.

1. Embodiment

[1-1. Configuration]

An alarm system 1 according to an example embodiment of the present disclosure is attached to a vehicle such as a passenger car. The alarm system 1 is constituted by a system that generates an audible sound with ultrasonic waves, and emits the audible sound to a target such as a pedestrian or the like. The vehicle on which the alarm system 1 is mounted is also referred to as a subject vehicle.

Figure 1:
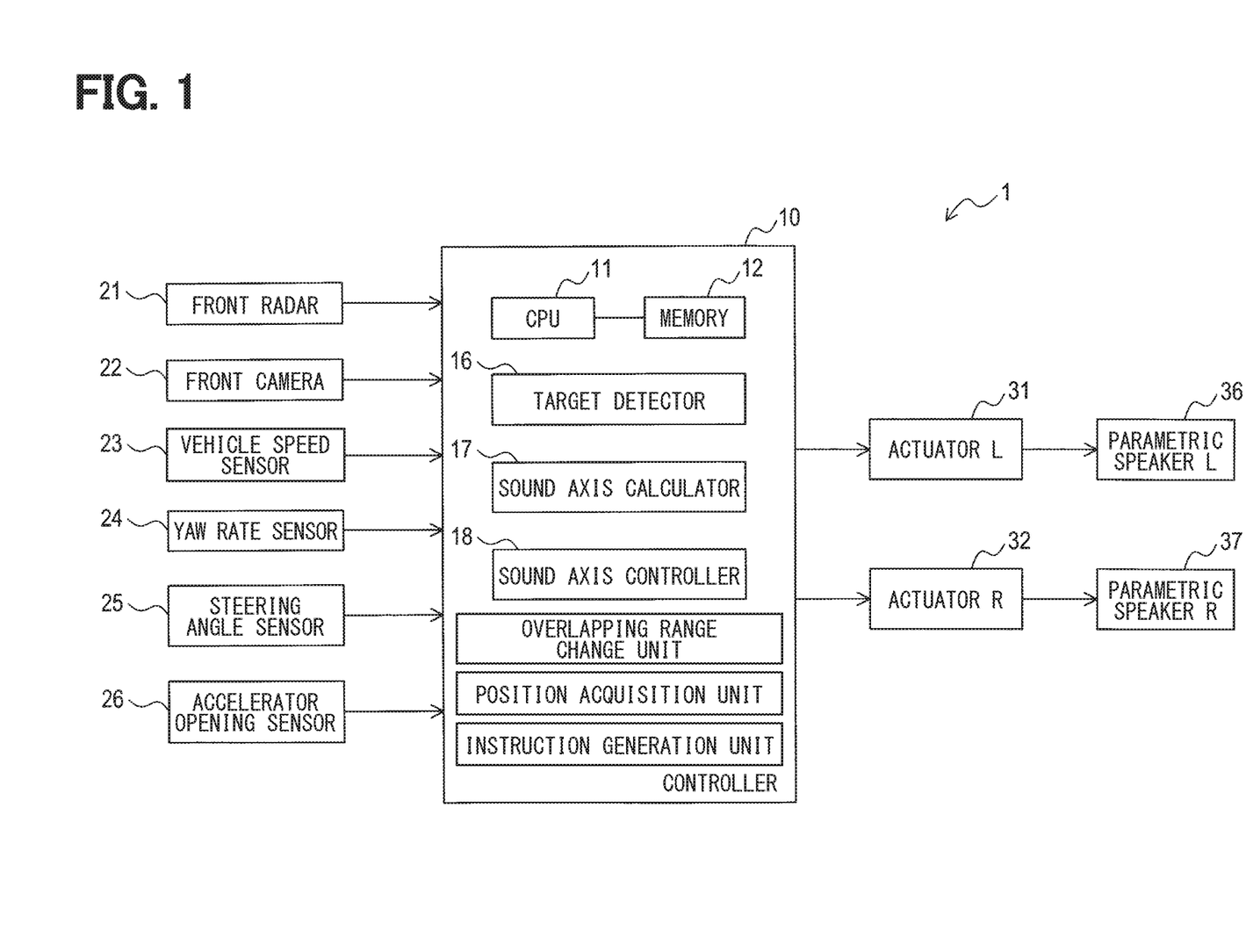
FIG. 1 is a block diagram showing a configuration of an alarm system.

As shown in FIG. 1, the alarm system 1 includes a controller 10 and multiple parametric speakers L36, R37. The alarm system 1 may also include a front radar 21, a front camera 22, a vehicle speed sensor 23, a yaw rate sensor 24, a steering angle sensor 25, an accelerator opening sensor 26, actuators L31, R32, or the like.

Figure 2:
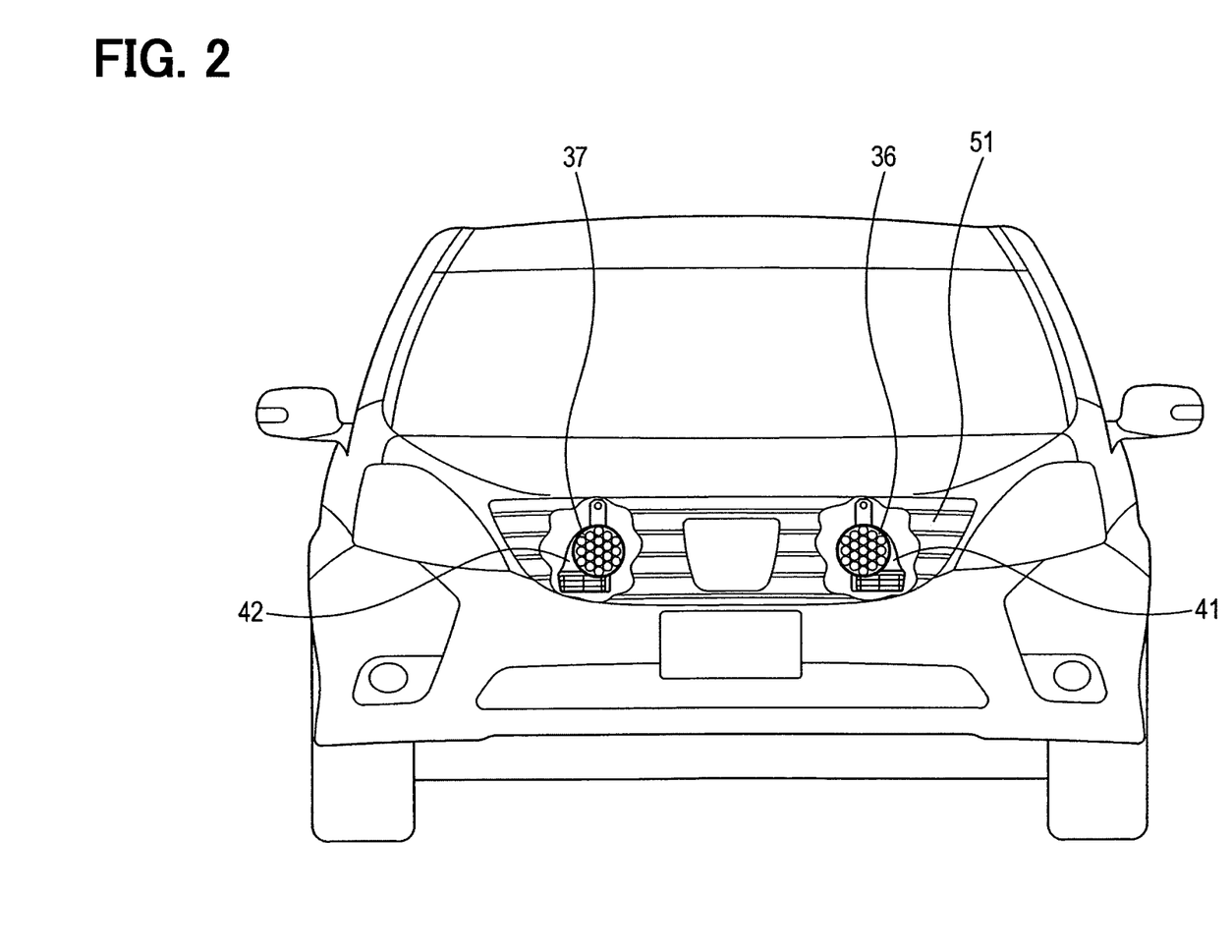
FIG. 2 is a diagram an explanatory diagram showing an arrangement example of parametric speakers.

As shown in FIG. 2, the parametric speakers L36, R37 are arranged in a front grille 51 of the subject vehicle along a horizontal direction. The front grille 51 has a large number of gaps, and the gaps function as vents for introducing a wind that cools a device inside the bonnet.

A pair of horns 41, 42 is arranged in the front grille 51, and the horns 41, 42 emit a horn sound from the gap of the front grille 51. A left parametric speaker L36 is arranged in front of a left horn 41 of the pair of horns along a front-rear direction of the subject vehicle. A right parametric speaker R37 is disposed in front of a right horn 42 of the pair of horns along the front-rear direction of the subject vehicle. Similarly to the horns 41, 42, the parametric speakers L36, R37 are arranged to be able to emit ultrasonic waves from the gap of the front grille 51.

Each of the parametric speakers L36, R37 emits the audible sound generated with the ultrasonic waves having the same phase into a sound field area indicating a predetermined area. The audible sound indicates a sound in the audible band to which the ultrasonic waves are modulated in amplitude modulation or the like.

The front radar 21 is constituted as a known radar. The front radar 21 emits an electromagnetic wave toward the front of the subject vehicle, and receives the reflected wave. The front radar 21 detects, as a distance measurement point, a distance and a direction of the target that reflects the electromagnetic wave.

The front camera 22 is constituted as a known camera. The front camera 22 captures an image in front of the subject vehicle and transmits the captured image to the controller 10.

The vehicle speed sensor 23 is constituted by a known vehicle speed sensor that detects the traveling speed of the subject vehicle.

The yaw rate sensor 24 is constituted by a known yaw rate sensor that detects the turning angular velocity of the subject vehicle.

The steering angle sensor 25 is constituted by a known steering angle sensor that detects the steering angle of the subject vehicle.

The accelerator opening sensor 26 is constituted by a known accelerator opening sensor that detects the depression degree of the accelerator pedal.

The actuators L31, R32 are respectively arranged to the parametric speakers L36, R37. Each of the actuators L31, R32 is constituted by an actuator such as a motor which changes the angle of the sound axis of the corresponding one of the parametric speakers L36, R37. The sound axis indicates the central axis of the sound waves output from each of the parametric speakers L36, R37. The parametric speakers L36, R37 may be constituted as flat speakers that emit the ultrasonic waves from a surface. The sound axis coincides with a direction orthogonal to the surface emitting the ultrasonic waves.

Further, as a mechanism for changing the angle of the sound axis of each of the parametric speakers L36, R37, a known mechanism such as a swivel mechanism, a leveling mechanism, or the like which is a mechanism for changing the direction of the headlight can be adopted as it is.

The controller 10 includes a well-known microcomputer having a CPU 11 and a semiconductor memory (hereinafter, referred to as a memory 12) such as a RAM, a ROM, or a flash memory. Various functions of the controller 10 are implemented by executing a program stored in a non-transitory tangible storage medium by the CPU 11. In this example, the memory 12 corresponds to the non-transitory tangible storage medium for storing a program.

When the program is executed, a method corresponding to the program is executed. The non-transitory tangible storage medium represent storage medium exclusive of electromagnetic waves. The number of microcomputers constituting the controller 10 may be one or more.

As a configuration of functions achieved by the program execution of the CPU 11, as shown in FIG. 1, the controller 10 includes a target detector 16, a sound axis calculator 17, and a sound axis controller 18. A method for implementing these elements constituting the controller 10 is not limited to software, and some or all of the elements may be implemented by using one or more hardware elements. For example, when the above functions are implemented by an electronic circuit that is hardware, the electronic circuit may be implemented by a digital circuit that includes a large number of logic circuits, an analog circuit, or a combination of the digital circuit and the analog circuit. The target detector 16, the sound axis calculator 17, and the sound axis controller 18 will be described later.

[1-2. Processing]

Next, a processing executed by the controller 10 will be described with reference to the flowchart of FIG. 3. First, at S110, the controller 10 executes a process for detecting a target and recognizing the type of the target.

In this process, the controller 10 functioning as the target detector 16 recognizes the existence of the target by combining the multiple distance measurement points obtained by the front radar 21. The controller 10 recognizes the existence of the target by executing image processing of the captured image obtained by the front camera 22. In this process, the controller 10 recognizes not only the existence of the target but also the position and the type of the target.

The position of the target is acquired by the distance and the direction included in the distance measurement point. In the recognition of the type of the target, the controller 10 determines which preliminary prepared types the target belongs using a processing such as well-known pattern matching.

At S120, the controller 10 determines whether the type of the target is a pedestrian. When the controller 10 determines that the type of the target is the pedestrian at S120, the processing proceeds to S130. At S130, the controller 10 acquires the distance and the direction of the pedestrian, the vehicle speed, the yaw rate, and the steering angle. When the controller 10 determines in S120 that the type of the target is not the pedestrian, the controller 10 terminates the alarm processing of FIG. 3.

At S140, the controller 10 determines whether an alarm on the target is necessary. In this process, for example, the controller 10 determines that the alarm is necessary when the possibility that the subject vehicle collide with the target pedestrian is equal to or more than a preliminary prepared threshold value. The possibility of collision between the pedestrian and the subject vehicle can be calculated using a known process using the relationship between the traveling direction of the subject vehicle and the position or traveling direction of the pedestrian. For example, when the future trajectory of the subject vehicle obtained from the vehicle speed, the yaw rate, the steering angle or the like passes within the distance range preset from the position of the pedestrian, the controller 10 may determine that the alarm is necessary.

When the controller 10 determines that the alarm on the target is necessary at S140, the processing proceeds to S150. At S150, the controller 10 functioning as the sound axis calculator 17 calculates the target sound axis. The directions of the sound axes are set so that the respective sound field areas, which are areas to which the sounds from the parametric speakers L36, R37 are emitted, overlap at the position of the target. An area where the sound field areas overlap is referred to as an overlapping area. The area to which the sound is emitted indicates a range in which a sound pressure equal to or higher than a predetermined pressure (for example, −3 dB) can be obtained along the direction of the sound axis.

Figure 4:
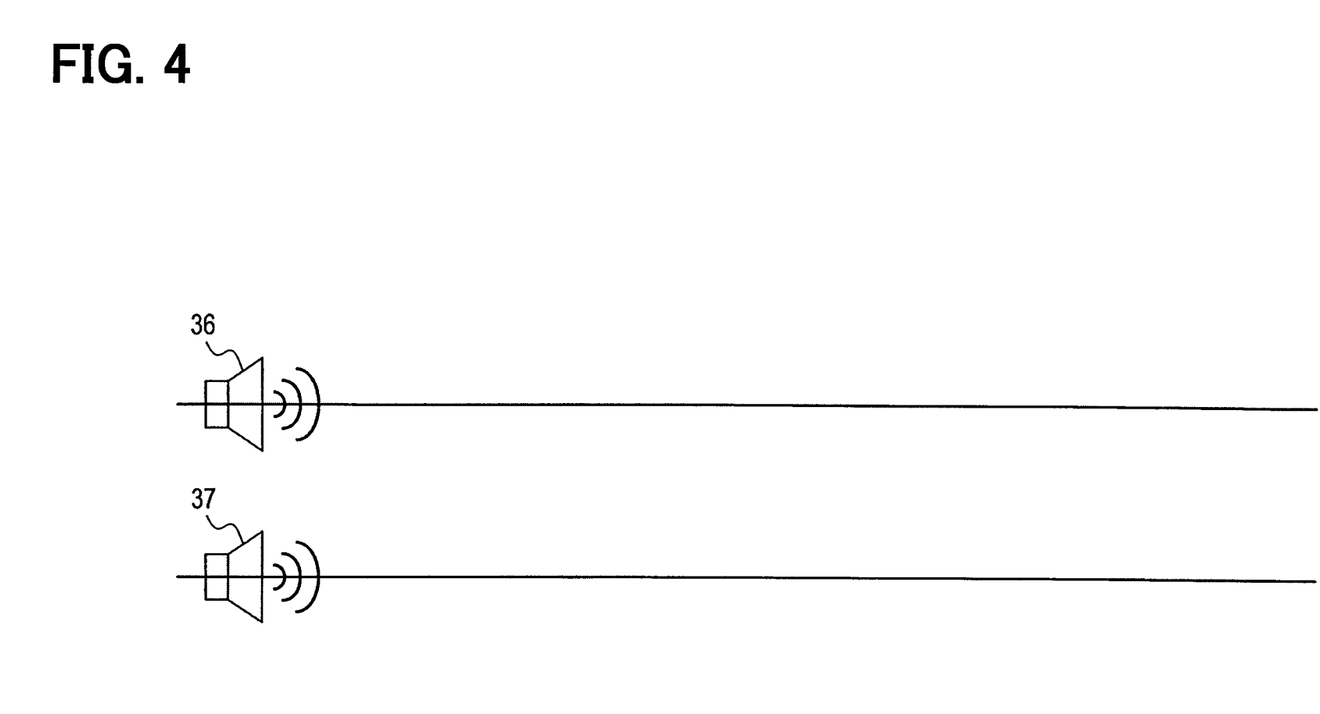
FIG. 4 is a plan view showing an example in which sounds are emitted from the parametric speakers in parallel.
Figure 5:
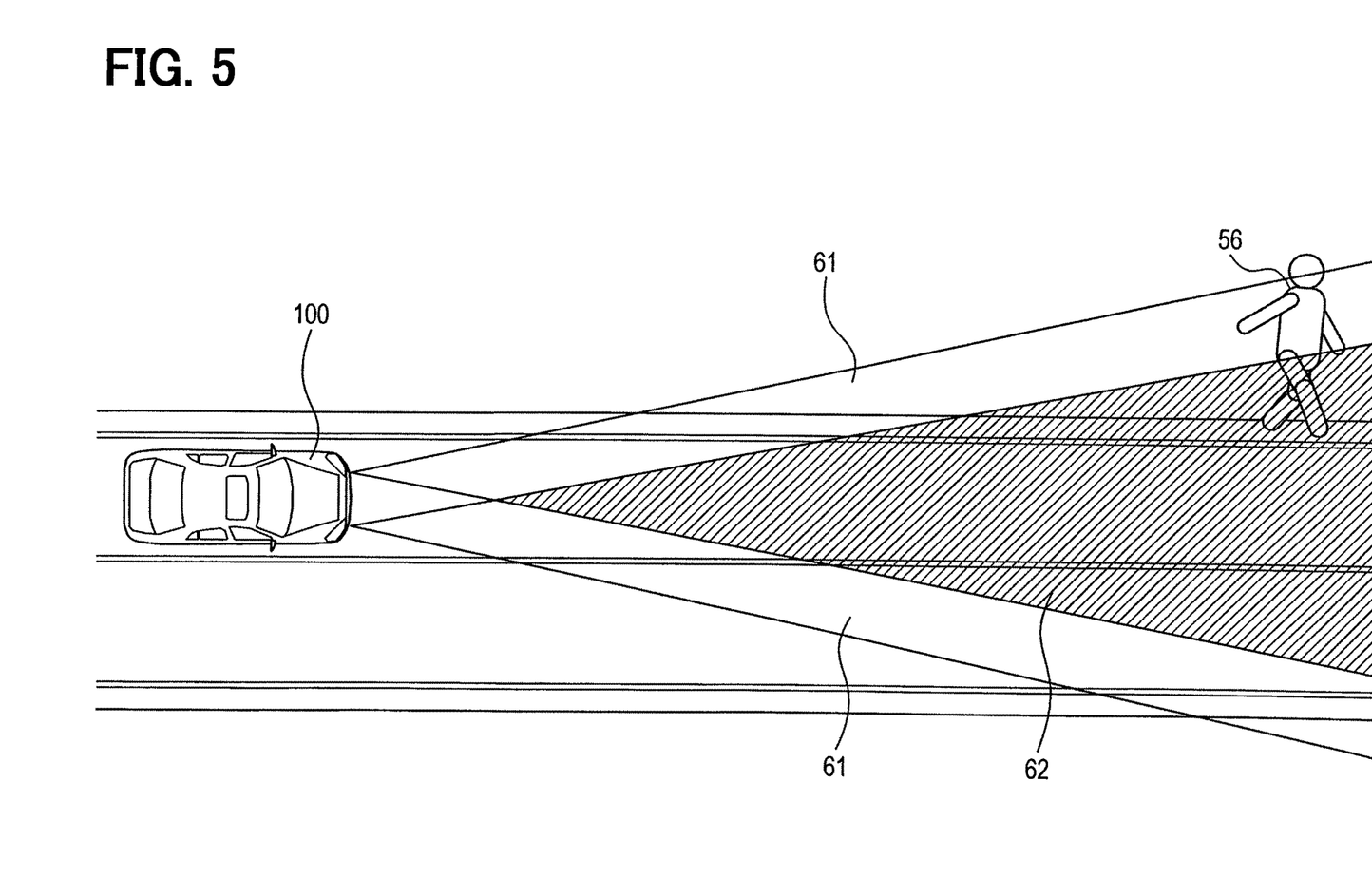
FIG. 5 is a plan view showing sound field areas and an overlapping area when sounds are emitted in parallel.

As shown in FIG. 4, the parametric speakers L36, R37 may be arranged along the horizontal direction, and the directions of the sound axes are parallel with one another. In this case, as shown in FIG. 5, the ultrasonic waves output from the parametric speakers L36, R37 generates the sound field areas 61 and the overlapping area 62. That is, the sound field areas 61 having a width corresponding to the distance between the parametric speakers L36, R37 exist on the left and right of the overlapping area 62. The sound field area 61 here indicates an area exclusive of the overlapping area 62.

When the sound pressure on the sound axis in the overlapping area 62 is set as a reference (0 dB), the sound pressure in the sound field area 61 can be less than −3 dB. With this configuration, the sound field area 61 can be quieter than the overlapping area 62. When the sound pressure in the overlapping area 62 is set as the reference, the sound pressure in an area exclusive of the sound field area 61 and the overlapping area 62 can be less than −6 dB. That is, the configuration can emit the loud sound to the position of the target, and cause the area in which the target does not exist to be quiet.

Figure 6:
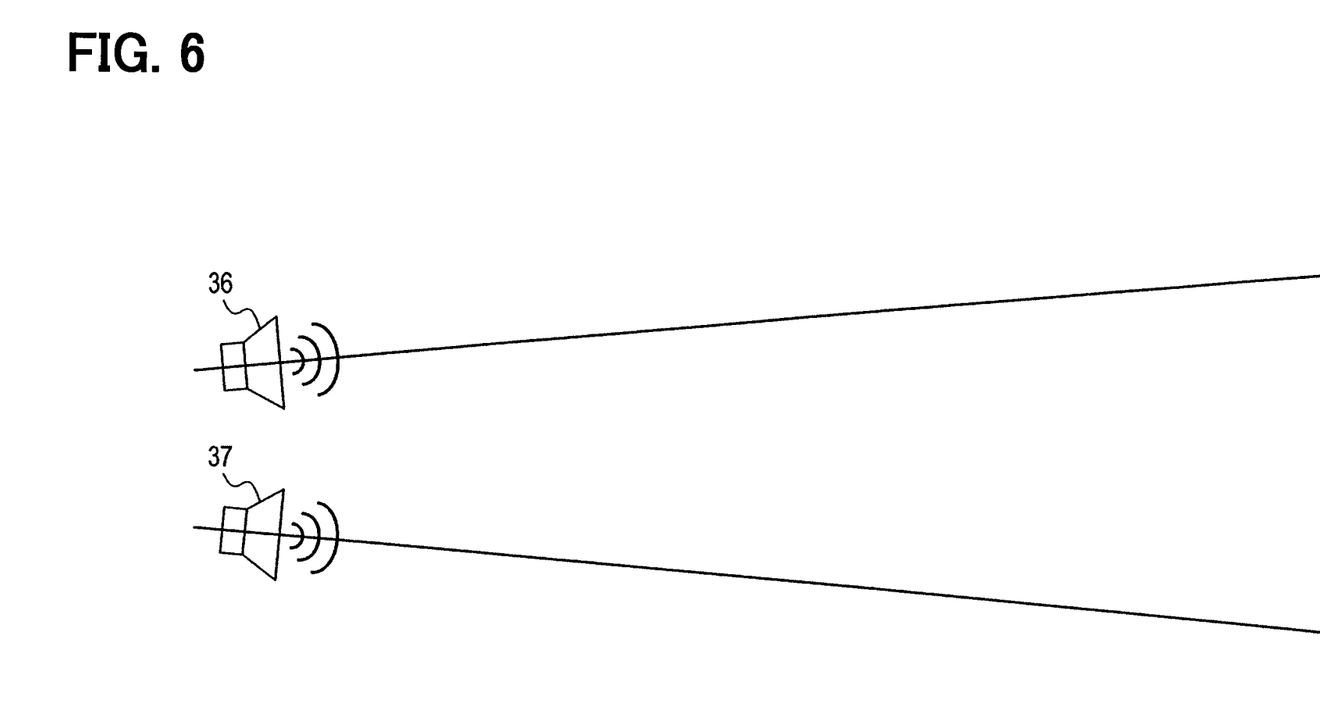
FIG. 6 is a plan view showing an example in which the parametric speakers emit sounds broader than parallel.
Figure 7:
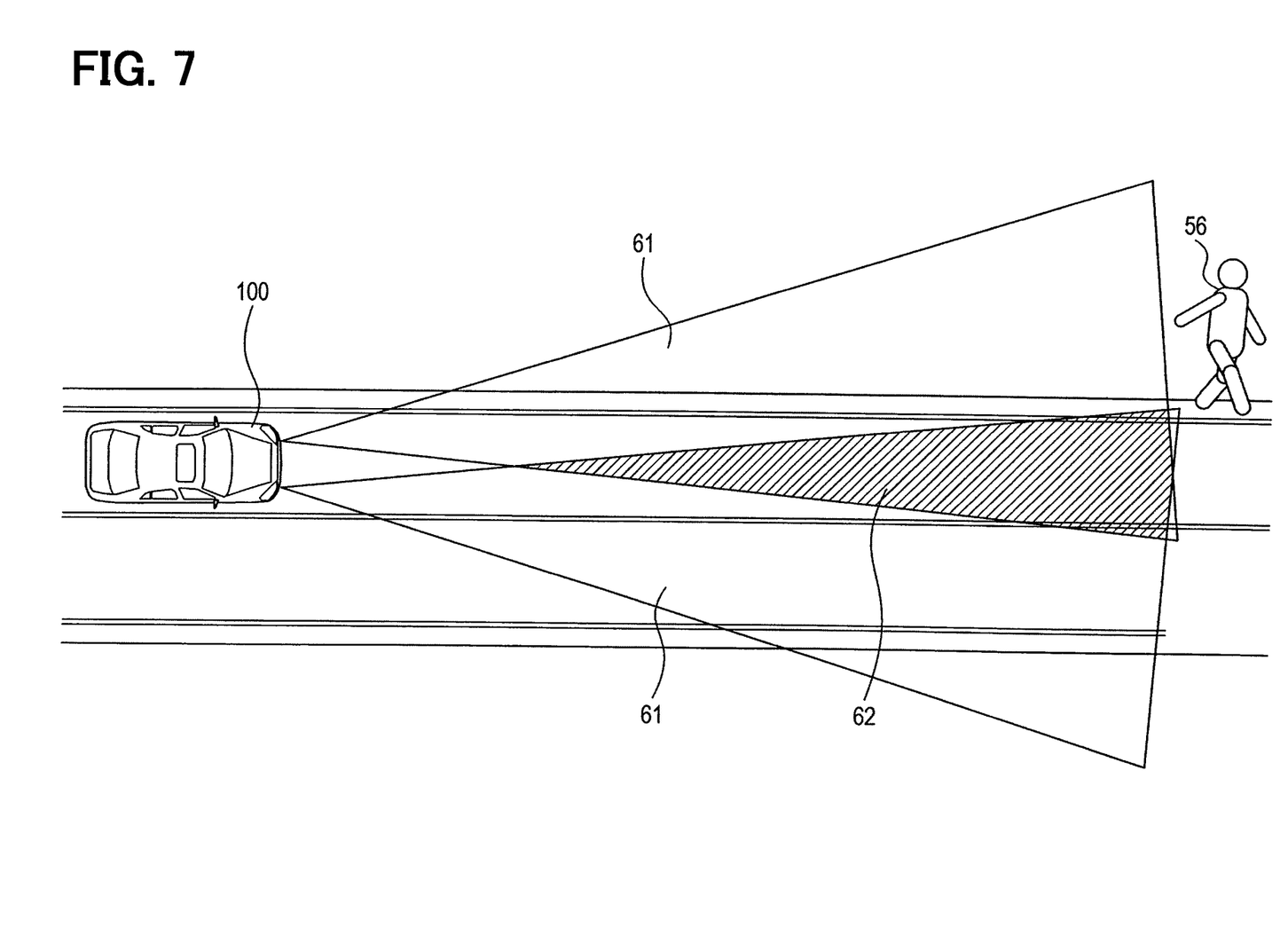
FIG. 7 is a plan view showing sound field areas and an overlapping area when the parametric speakers emit sounds broader than parallel.

As shown in FIG. 6, when the parametric speakers L36, R37 are displaced to extend the angle of the directions of the sound axes wider compared to parallel, that is, the central axes of the sound field areas are further widen in front of the subject vehicle. In this configuration, the sound field areas 61 and the overlapping area 62 as shown in FIG. 7 are generated. That is, compared with the case where the directions of the sound axes are parallel, the overlapping area 62 becomes smaller, and the sound field areas 61 become larger relative to the distance between the parametric speakers L36, R37.

Figure 8:
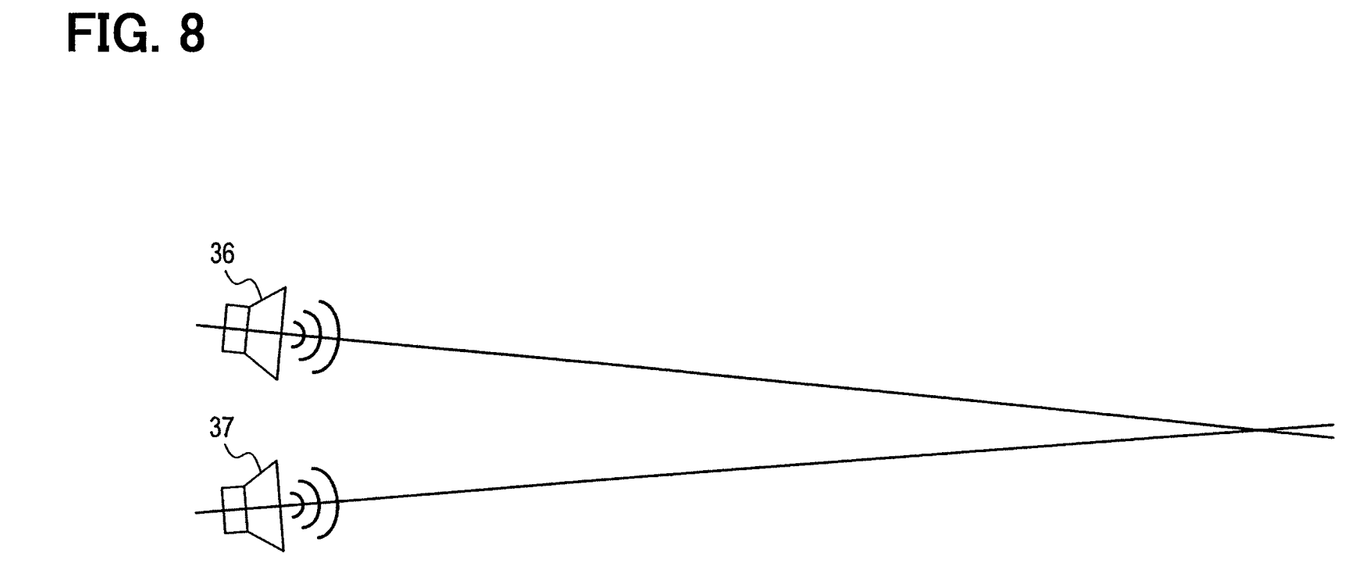
FIG. 8 is a plan view showing an example in which the parametric speakers emit sounds narrower than parallel.
Figure 9:
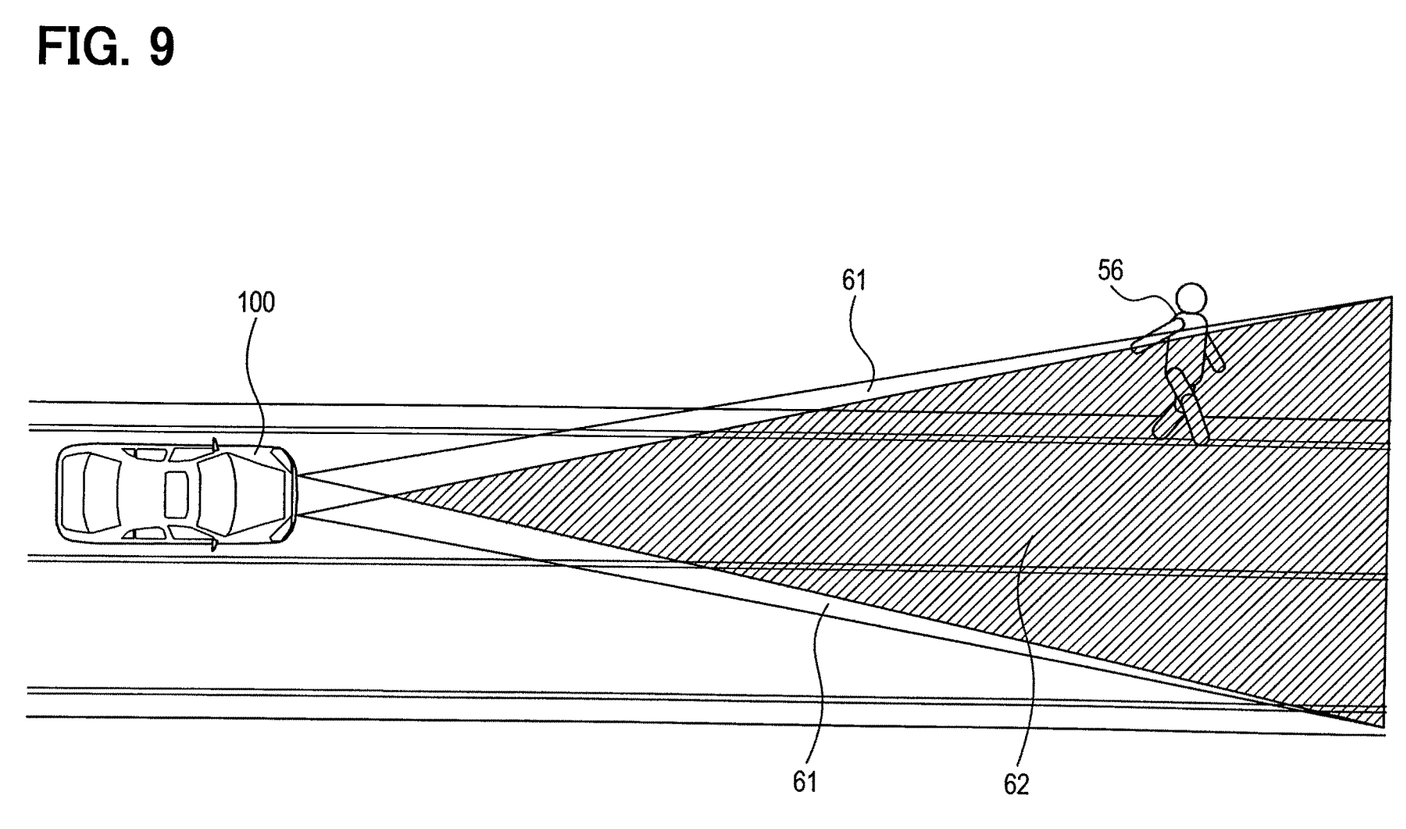
FIG. 9 is a plan view showing sound field areas and an overlapping area when the parametric speakers emit sounds narrower than parallel.

As shown in FIG. 8, when the parametric speakers L36, R37 are displaced to extend the angle of the directions of the sound axes narrower compared to parallel, that is, the central axes of the sound field areas are further narrowed in front of the subject vehicle. In this configuration, the sound field areas 61 and the overlapping area 62 as shown in FIG. 9 are generated. That is, compared with the case where the directions of the sound axes are parallel, the overlapping area 62 becomes larger, and the sound field areas 61 become smaller relative to the distance between the parametric speakers L36, R37.

Figure 10:
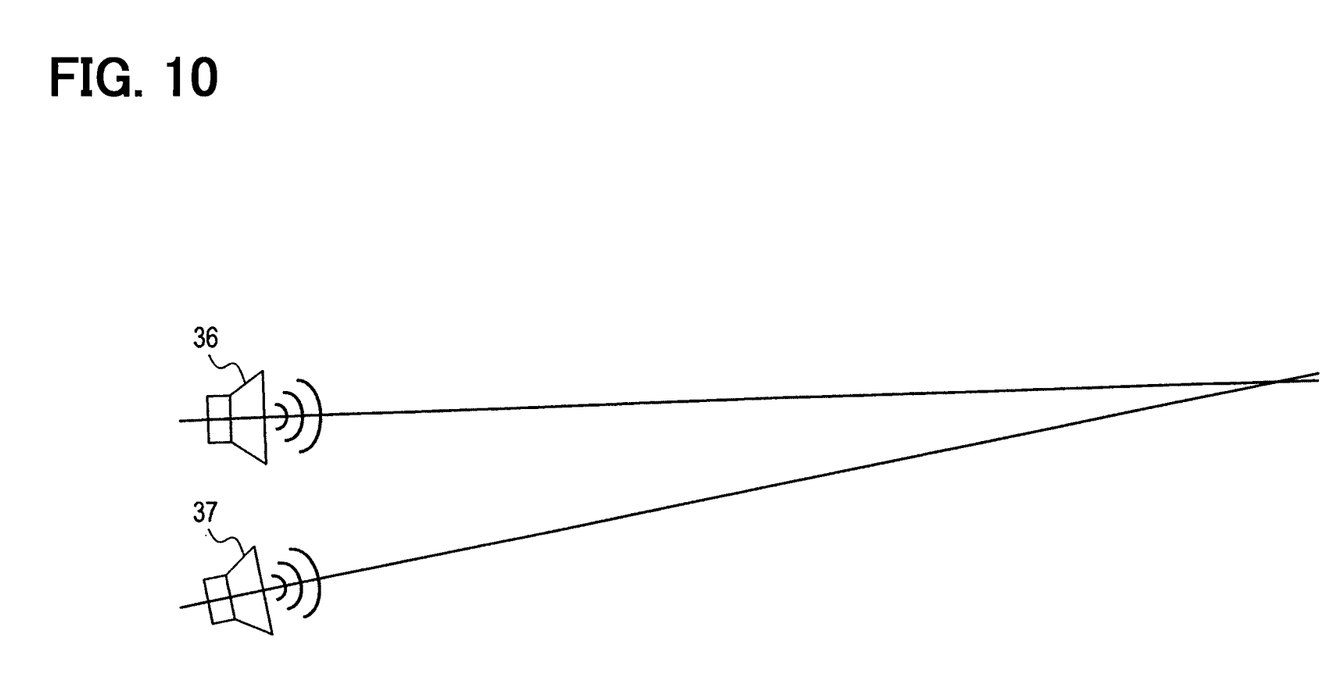
FIG. 10 is a plan view showing an example in which the parametric speakers emit sounds to be narrowed to the left.

As described above, the displacement of the directions of the sound axes of the parametric speakers L36, R37 can change the range of the overlapping area 62. Alternatively, depending on the position of the target, one of the parametric speakers L36, R37 may be displaced. For example, as shown in FIG. 10, the direction of the sound axis of the parametric speaker L36 is set to the front, and the direction of the sound axis of the parametric speaker R37 is set narrower compared to parallel.

Figure 11:
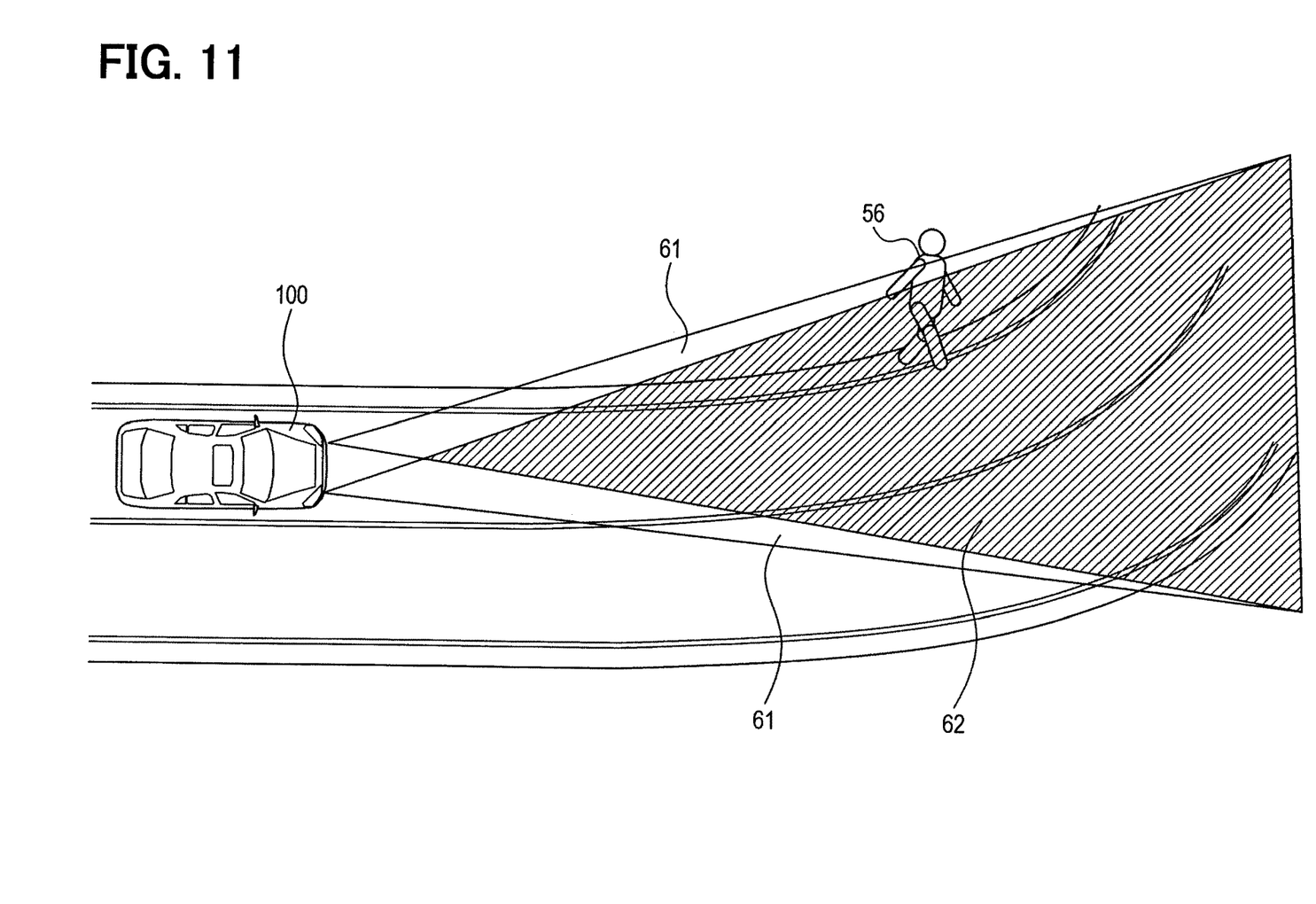
FIG. 11 is a plan view showing sound field areas and an overlapping area when the parametric speakers emit sounds to be narrowed to the left.

With this configuration, the overlapping area 62 can be moved to the left and right as compared with the case where the parametric speakers L36, R37 are evenly displaced. Thus, as shown in FIG. 11, the overlapping area 62 can be set to a curving road, or the like.

In this process, the direction of the central axis may be set so that the position of the target falls within the range of the overlapping area 62, and a change instruction for changing the range of the overlapping area 62 may be generated. In particular, it is preferable to set the direction of the central axis so that the position of the target is located at the center of the overlapping area 62 in the left and right direction.

In the present process, as the position of the target becomes closer, the change instruction is generated to cause the central axes of the sound field areas 61 to be closer to one another in front of the vehicle. In addition, as the vehicle speed decreases, the change instruction is generated to cause the central axes of the sound field areas 61 to be closer to one another in front of the vehicle.

Here, "to cause the central axes to be closer to one another in front of the vehicle" means that the central axes are moved to the direction to be parallel or to the direction intersecting in front of the subject vehicle when the central axes do not intersect in front of the vehicle, that is, when the central axes are separated from one another compared to parallel. In addition, when the central axes already intersect in front of the subject vehicle, it indicates that the central axes are moved so that the intersecting position is closer to the subject vehicle.

Figure 3:
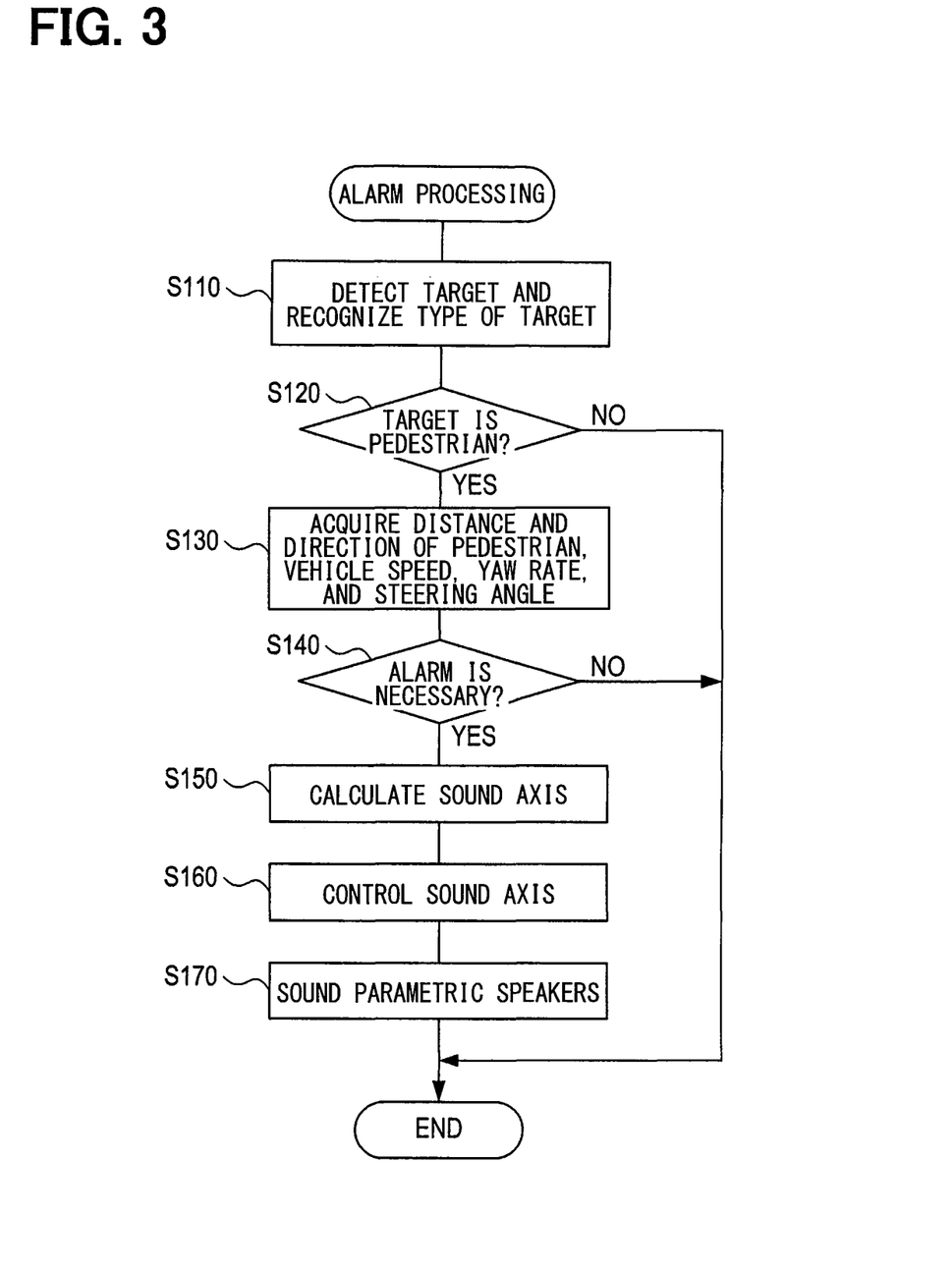
FIG. 3 is a flowchart showing an alarm processing.

When the controller 10 determines in S140 that the alarm on the target is not necessary, the controller 10 terminates the alarm processing of FIG. 3.

At S160, the controller 10 functioning as the sound axis controller 18 transmits the change instruction to the actuators L31, R32. With this process, the sound axes of the parametric speakers L36, R37 are controlled to coincide with the direction designated by the change instruction. Thereafter, the alarm processing of FIG. 3 is terminated.

[1-3. Effects]

According to the embodiment described above, the following effects are achieved.

(1a) The alarm system 1 includes the multiple parametric speakers L36, R37 and the function as the sound axis controller 18 of the controller 10. The multiple parametric speakers L36, R37 are arranged along a horizontal direction. Each of the multiple parametric speakers L36, R37 emits the audible sound generated with the ultrasonic waves having the same phase into a sound field area indicating a predetermined area. The sound axis controller 18 changes the range of the overlapping area where the sound field areas overlap in response to the external instruction.

The alarm system 1 can widen or narrow the overlapping area where the sound field areas generated with the multiple parametric speakers L36, R37 in response to the external instruction. The overlapping area is the range where the ultrasonic waves are superimposed to make the audible sound louder and the sound is easy to be heard. Thus, the alarm system 1 can arbitrarily set the range of the audible sound emitted from the vehicle to be easily heard.

(1b) In the alarm system 1 described above, the controller 10 further includes the function of the target detector 16 and the function of the sound axis calculator 17. The target detector 16 detects the position of the target located around the vehicle. The sound axis calculator 17 generates the change instruction for changing the range of the overlapping area so that the position of the target is included in the overlapping area. The sound axis controller 18 changes the range of the overlapping area in response to the change instruction as the external instruction.

The alarm system 1 causes the position of the target to be included in the overlapping area. Thus, the audible sound can be easily heard at the position of the target.

(1c) In the alarm system 1 described above, the sound axis controller 18 causes at least one of the multiple parametric speakers L36, R37 to displace the output direction of the ultrasonic waves so that the output direction of the ultrasonic waves of the at least one of the multiple parametric speakers L36, R37 coincides with the direction designated by the external instruction.

With the alarm system 1 described above, the at least one of the multiple parametric speakers L36, R37 displaces the output direction of the ultrasonic waves. Thus, the alarm system 1 can reliably change the range of the overlapping area.

(1d) In the alarm system 1 described above, the sound axis calculator 17 generates the change instruction to cause the central axes of the sound field areas to be closer to one another in front of the vehicle.

As the position of the target becomes closer, the above-described alarm system 1 causes the center axes of the sound field areas to be closer to the vehicle in the front direction and widens the overlapping area. With this configuration, even when the position of the target becomes closer and the directions to which the parametric speakers L36, R37 output the sound deviate from the direction to the target, the target can be easily included in the overlapping area.

(1e) In the alarm system 1 described above, the target detector 16 acquires the vehicle speed, and the sound axis calculator 17 generates the change instruction to cause the central axes of the sound field areas to be closer to one another in front of the vehicle as the vehicle speed decreases.

The above-described alarm system 1 causes the central axes of the sound field areas to be closer to one another in front of the vehicle and widens the overlapping area. Thus, when the vehicle decelerates and turns, the target can easily get into the turning area.

2. Other Embodiments

Although the embodiments of the present disclosure have been described above, the present disclosure is not limited to the embodiments described above, and various modifications can be made to implement the present disclosure.

(2a) In the above embodiment, as the position of the target located around the vehicle, the alarm system 1 detects the position of an object such as the pedestrian, and controls the direction of the sound axis so that the position of the object is included in the overlapping area 62. There is no need to be limited thereto. For example, as the position of the target, curvature degree of the road on which the subject vehicle is traveling may be acquired.

The curvature degree indicates the curvature of the road, the radius of the curvature of the road, the positions of the left and right ends of the road at a position away from the subject vehicle by a predetermined distance, or the like. In this case, the direction of the sound axis may be controlled so that the positions of the ends are included in the overlapping area 62 corresponding to the positions of the left and right ends of the road.

(2b) In the above embodiment, the alarm system 1 changes the range of the overlapping area 62 by controlling the direction of the sound axis of at least one of the parametric speakers L36, R37. There is no need to be limited thereto. For example, the alarm system 1 changes the distance between the multiple parametric speakers L36, R37 by moving at least one of the parametric speakers L36, R37. With this configuration, the range of the overlapping area 62 may be changed.

Alternatively, the range of the overlapping area 62 may be changed by changing the directivity of the ultrasonic waves emitted from the parametric speakers L36, R37. In order to change the directivity, for example, the frequency of the ultrasonic waves may be changed.

(2c) A plurality of functions of one element in the above embodiment may be implemented by a plurality of elements, or one function of one element may be implemented by a plurality of elements. Further, a plurality of functions of a plurality of elements may be implemented by one element, or one function implemented by a plurality of elements may be implemented by one element. A part of the configuration of the above embodiment may be omitted. At least a part of the configuration of the above embodiment may be added to or replaced with another configuration of the above embodiment. All modes included in the technical idea identified by the wording described in the claims correspond to embodiments of the present disclosure.

(2d) In addition to the alarm system 1 described above, various features such as a device constituting the alarm system 1, a program for making the computer function as the alarm system 1, a non-transitory tangible storage medium such as a semiconductor memory in which the program is stored, and an alarm method may be provided to realize the present disclosure.

3. Correspondence Relation Between the Configuration of the Present Embodiments and the Configuration of the Present Disclosure In the above embodiments, the alarm system 1 corresponds to an ultrasonic wave output device in the present disclosure, and the parametric speakers L36, R37 correspond to ultrasonic wave output units in the present disclosure. The process at S130 in the processing executed by the controller 10 corresponds to a position acquisition unit and a vehicle speed acquisition unit in the present disclosure, and the process at S150 corresponds to an instruction generation unit in the present disclosure. The process at S160 corresponds to an overlapping range change unit in the present disclosure.

The invention claimed is:

1. An ultrasonic wave output device comprising:
a plurality of ultrasonic wave output units configured to be arranged along a horizontal direction in a vehicle, each of the plurality of ultrasonic wave output units configured to emit an audible sound generated with ultrasonic waves, which have a same phase, to corresponding one of a plurality of sound areas, the plurality of sound areas indicate predetermined areas;
a vehicle speed acquisition unit configured to acquire a vehicle speed of the vehicle;
an instruction generation unit configured to generate a change instruction causing central axes of the plurality of sound areas to be closer to one another in front of the vehicle as the vehicle speed decreases; and
an overlapping range change unit configured to change a range of an overlapping area, which indicates an area on which the plurality of sound areas overlap, in response to the change instruction.

2. The ultrasonic wave output device according to claim 1, further comprising:
a position acquisition unit configured to acquire a position of target located around the vehicle wherein
the instruction generation unit generates the change instruction for changing the range of the overlapping area to include the position of target.

3. The ultrasonic wave output device according to claim 2, wherein
the overlapping range change unit changes a direction of at least one of the plurality of ultrasonic wave output units outputting the ultrasonic waves to cause the direction of the at least one of the plurality of ultrasonic wave output units outputting the ultrasonic waves to coincide with a direction designated by the external instruction.

4. The ultrasonic wave output device according to claim 3, wherein
the instruction generation unit generates the change instruction causing central axes of the plurality of sound areas to be closer to one another in front of the vehicle as the position of target becomes closer.

5. An ultrasonic wave output device comprising:
a plurality of ultrasonic wave output units configured to be arranged along a horizontal direction in a vehicle, each of the plurality of ultrasonic wave output units configured to emit an audible sound generated with ultrasonic waves, which have a same phase, to corresponding one of a plurality of sound areas, the plurality of sound areas indicate predetermined areas; and
a processor configured to
   acquire a vehicle speed of the vehicle,
   generate a change instruction causing central axes of the plurality of sound areas to be closer to one another in front of the vehicle as the vehicle speed decreases, and
   change a range of an overlapping area, which indicates an area on which the plurality of sound areas overlap, in response to the change instruction.

* * * * *